US012472428B2

(12) United States Patent
Waropas

(10) Patent No.: US 12,472,428 B2
(45) Date of Patent: Nov. 18, 2025

(54) ENABLING A COACH AND MULTIPLE PLAYERS TO INTERACT IN A VIRTUAL GAME SESSION

(71) Applicant: Nitikorn Waropas, Portland, OR (US)

(72) Inventor: Nitikorn Waropas, Portland, OR (US)

( * ) Notice: Subject to any disclaimer, the term of this patent is extended or adjusted under 35 U.S.C. 154(b) by 375 days.

(21) Appl. No.: 18/067,419

(22) Filed: Dec. 16, 2022

(65) Prior Publication Data

US 2024/0198220 A1 Jun. 20, 2024

(51) Int. Cl.

| | |
|---|---|
| ***A63F 13/426*** | (2014.01) |
| ***A63F 13/533*** | (2014.01) |
| ***A63F 13/56*** | (2014.01) |
| ***A63F 13/86*** | (2014.01) |
| *A63F 13/812* | (2014.01) |

(52) U.S. Cl.

CPC .......... *A63F 13/426* (2014.09); *A63F 13/533* (2014.09); *A63F 13/56* (2014.09); *A63F 13/86* (2014.09); *A63F 13/812* (2014.09); *A63F 2300/308* (2013.01); *A63F 2300/577* (2013.01); *A63F 2300/6045* (2013.01)

(58) Field of Classification Search

CPC ...... A63F 13/426; A63F 13/533; A63F 13/56; A63F 13/86; A63F 13/812; A63F 2300/308; A63F 2300/577; A63F 2300/6045

USPC .......................................................... 463/31

See application file for complete search history.

(56) References Cited

U.S. PATENT DOCUMENTS

| | | | | |
|---|---|---|---|---|
| 9,393,486 | B2 * | 7/2016 | George | A63F 13/00 |
| 10,589,172 | B1 * | 3/2020 | Nash | A63F 13/53 |
| 10,720,011 | B2 * | 7/2020 | Green | G07F 17/3288 |
| 2002/0132211 | A1 * | 9/2002 | August | G09B 19/0038 434/362 |
| 2008/0132334 | A1 * | 6/2008 | Nonaka | A63F 13/428 463/43 |
| 2011/0263306 | A1 * | 10/2011 | Nakamura | G06Q 30/0258 463/4 |
| 2011/0294580 | A1 * | 12/2011 | Nakamura | A63F 13/58 463/42 |
| 2017/0046967 | A1 * | 2/2017 | Sundquist | A63B 69/00 |
| 2017/0171614 | A1 * | 6/2017 | el Kaliouby | G16H 50/70 |
| 2017/0368439 | A1 * | 12/2017 | Khazanov | A63B 24/0075 |
| 2021/0394067 | A1 * | 12/2021 | Saito | A63F 13/57 |
| 2021/0402292 | A1 * | 12/2021 | Chow | A63F 13/79 |
| 2023/0381652 | A1 * | 11/2023 | Rudi | A63F 13/69 |
| 2024/0045639 | A1 * | 2/2024 | Yang | G06F 3/1454 |
| 2025/0037322 | A1 * | 1/2025 | Yoneda | H04N 23/90 |

* cited by examiner

*Primary Examiner* — Malina D. Blaise

(74) *Attorney, Agent, or Firm* — PERKINS COIE LLP

(57) ABSTRACT

The disclosed system enables players and a coach to interact in a virtual game session. The system provides a virtual sports field, virtual players, and opposing virtual players, where a virtual player is controlled by a player and the coach, while the multiple opposing virtual players are configured to be controlled by the coach. The system receives an input from the coach indicating a movement of the virtual player. The system provides the input to the player controlling the virtual player. Upon providing the input to the player, the system receives an input moving the virtual player and renders the virtual player based on the input. The system receives an input from the coach indicating a movement of the opposing virtual players and renders the opposing virtual players based on the input from the coach.

20 Claims, 14 Drawing Sheets

ENABLING A COACH AND MULTIPLE PLAYERS TO INTERACT IN A VIRTUAL GAME SESSION

BACKGROUND

Success and victory of sports teams comes from planning and preparation. An important factor in planning is to determine the direction of play for all the players in all sectors. Further, all the players in all the sectors need to have a general understanding of team strategy and tactics. Generally, the coach drives the strategy and tactics. Currently, the coach's planning tools involve paper, a small portable whiteboard, or a wallboard. The coach can only focus on a specific position on the paper or board. Players in such positions feel involved in the plan, however, players in other parts of the board may not be interested as much because their positions do not play a part in the conversation. Consequently, the players can grow bored and disinterested.

BRIEF DESCRIPTION OF THE DRAWINGS

Detailed descriptions of implementations of the present invention will be described and explained through the use of the accompanying drawings.

Figure 1:
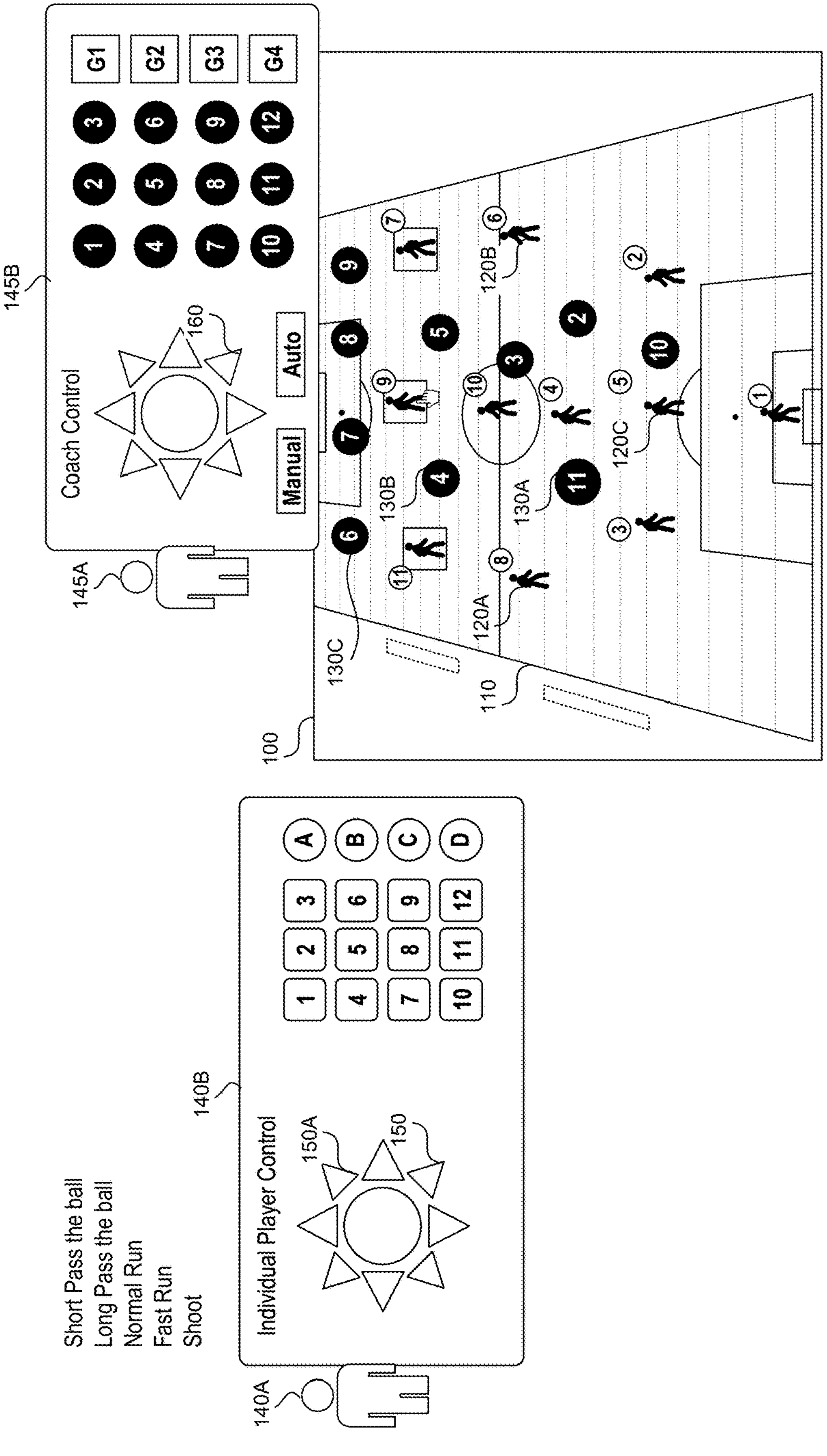
FIG. 1 shows a virtual session, according to one embodiment.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method enable multiple players and a coach to interact in a virtual game session. The system provides a virtual sports field, multiple virtual players associated with the multiple players, and multiple opposing virtual players, where a virtual player among the multiple virtual players is configured to be controlled by a player among the multiple players and the coach, while the multiple opposing virtual players are configured to be controlled by the coach. The system receives an input from the coach indicating a movement of the virtual player. The system can receive the input through a chat channel, an audio channel, through the drawing board, etc.

The system provides the input to the player among the multiple players controlling the virtual player. Upon providing the input to the player, the system receives an input moving the virtual player and renders the virtual player based on the input moving the virtual player. The system receives an input from the coach indicating a movement of the multiple opposing virtual players. Upon receiving the input from the coach indicating the movement of the multiple opposing virtual players, the system renders the multiple opposing virtual players based on the input from the coach indicating the movement of the multiple opposing virtual players.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Enabling a Coach and Multiple Players to Interact in a Virtual Game Session

FIG. 1 shows a virtual session 100, according to one embodiment. The virtual session 100 enables multiple players and a coach to interact, create a game plan, or analyze a previously recorded game. The virtual session 100 can be a virtual game planning session and can include a virtual field 110, multiple virtual players 120A, 120B, 120C (only three labeled for brevity) belonging to one team, and multiple opposing virtual players 130A, 130B, 130C (only three labeled for brevity) belonging to the opposing team. The virtual players 120A, 120B, 120C and the multiple opposing virtual players 130A, 130B, 130C can be rendered as geometric shapes such as dots as seen in FIG. 1 or as animated players 120A, 120B, 120C.

Each player 140A can control one virtual player 120A, 120B, 120C, using the console 140B, while the coach 145A can control each virtual player 120A, 120B, 120C as well as all the opposing virtual players 130A, 130B, 130C using the console 145B. The consoles 140B, 145B can be displayed on a device associated with the user such as a computer, a mobile device, a tablet, a watch, smart glasses, etc. Alternatively, the consoles 140B, 145B can be gaming consoles. In addition, each player 140A and the coach 145A can control the players 120A, 120B, 120C, 130A, 130B, 130C using gestures on a touchscreen.

The player 140A can use the controls 150 to rotate the player or move the player in a particular direction, e.g., 150A (only one labeled for brevity). To run in a particular direction, e.g., 150A, the player can hold the arrow 150A. To quickly run in a particular direction, the player can double-click the arrow 150A and hold the arrow 150A.

By pressing the button A, the player 140A can indicate to the system that the player is about to select a teammate 120A, 120B, 120C to whom the player will pass the ball. The player 140A can select the teammate by selecting a corresponding number 1-12 on the console 140B. For example, if the player 140A selects number 1 on the console 140B, the player indicates to pass the ball to the goalie, or if the player selects number 8 on the console 140B, the player indicates to pass the ball to the teammate 120A.

By selecting the button B, the player 140A can indicate to the system to short-pass the ball to the selected teammate 120A. By selecting the button C, the player 140A can indicate to long-pass the ball to the selected teammate 120A. By selecting the button D, the player 140A can indicate to the system to shoot at the opposing team's goal.

The coach 145A can use the controls 160 to rotate any player 120A, 120B, 120C, 130A, 130B, 130C on the field, or move any player in a particular direction. For example, the coach 145A can use the numbers 1-11 on the console 145B to select a virtual player 120A, 120B, 120C to control. In addition, the coach can control the players 130A, 130B, 130C of the opposing team. To control the players of the opposing team, the coach can create multiple groups of players G1, G2, G3, G4. The group can include zero or more players 130A, 130B, 130C of the opposing team. After creating the groups of players G1, G2, G3, G4, the coach 145A can move the whole group of players using the controls 160. Removing multiple players at the same time, the coach can effectively and interactively manage all the players on the virtual field 110.

The coach 145A can record the session, upload the session to a server, e.g., a cloud, create a link to the recording, and share with the players participating in the session or other players for later review and learning.

Figure 2:
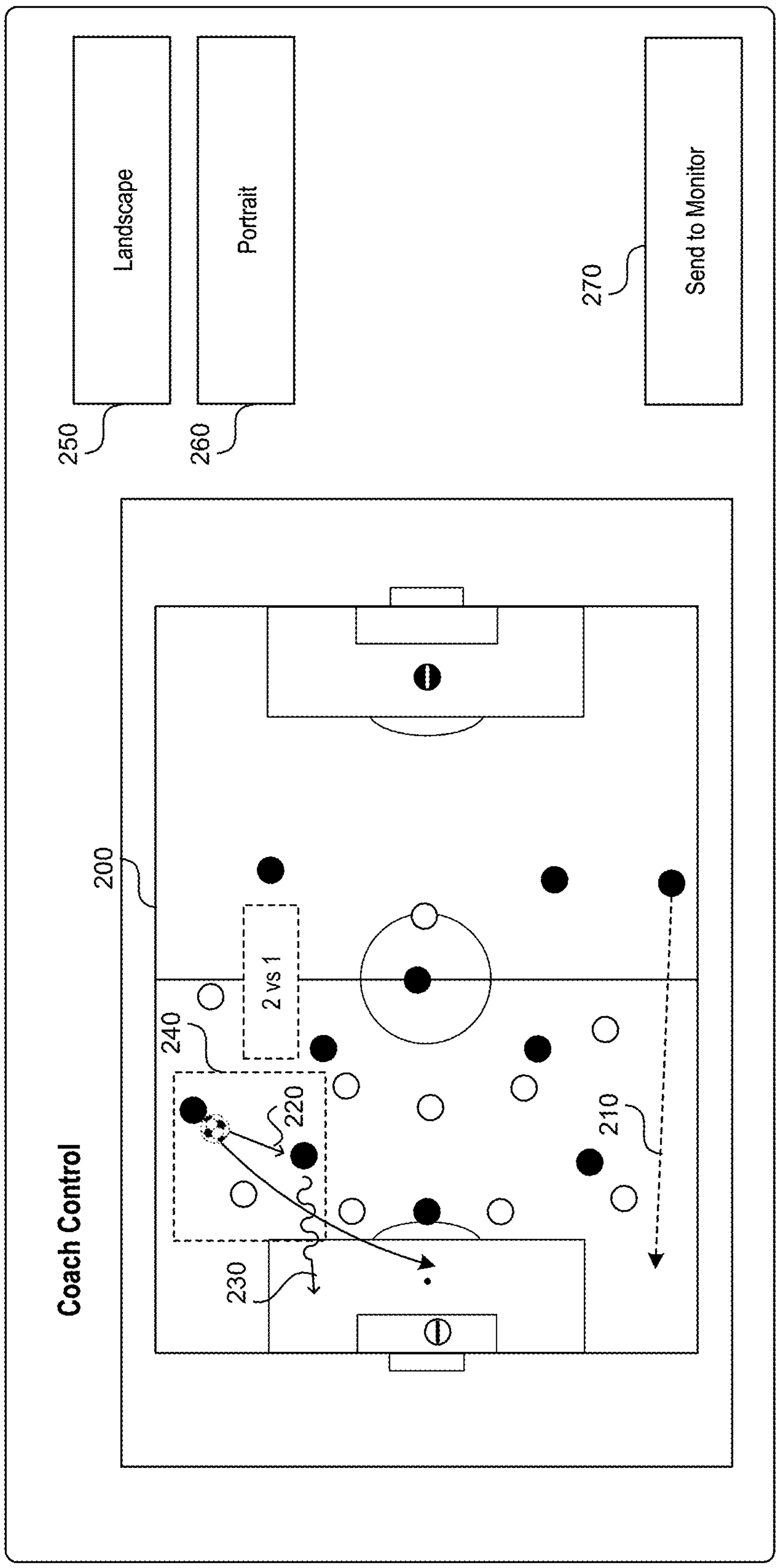
FIG. 2 shows the visual feedback that a coach can provide to the players.

FIG. 2 shows the visual feedback that a coach can provide to the players. In addition to controlling the movement of all the players, as described in this application, the coach can provide visual, textual, and audio feedback to the players. The virtual field 200 can be rendered in a more abstract way compared to the virtual field 110 in FIG. 1. The virtual field 110, 200 can be viewed from the side, from the top, as seen in FIG. 2, from the back, as seen in FIG. 1, etc. In addition to the virtual field 110, 200, the system can provide a recording of a virtual, previously played game, an actual played game, such as a professional game, or a game that the team played. The system can enable the coach and the players to analyze a previously recorded virtual or actual game.

The system can provide tools to the coach to comment on the recording of an actual game, or to comment on the virtual field 110, 200. The virtual field 110, 200 can represent a game that the coach is currently developing with the players or can be a recorded virtual game. The system can provide drawing tools such as arrows 210, 220, 230 and/or boxes 240. The system can also provide an audio, a chat channel, or a drawing board for the coach and the players to interact.

Upon receiving a selection of the buttons 250, 260, the system can render the recording of a game or the virtual field 110, 200 in a portrait or landscape mode, respectively. In addition, upon receiving the selection of the button 270, the system can provide the audio and video on a monitor, as described in this application.

Figure 3:
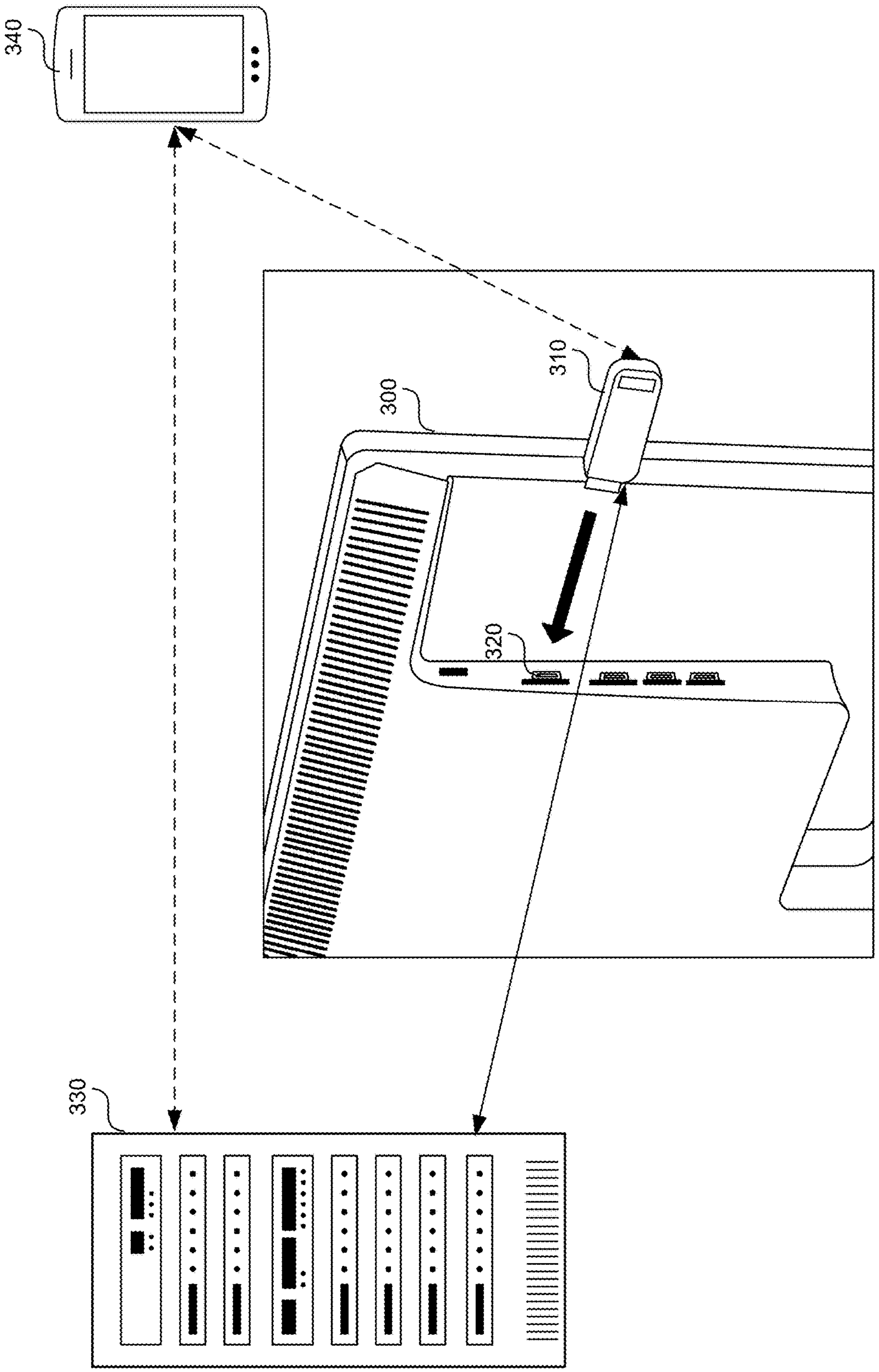
FIG. 3 shows a system to cast the virtual session to a monitor.
Figure 4A:
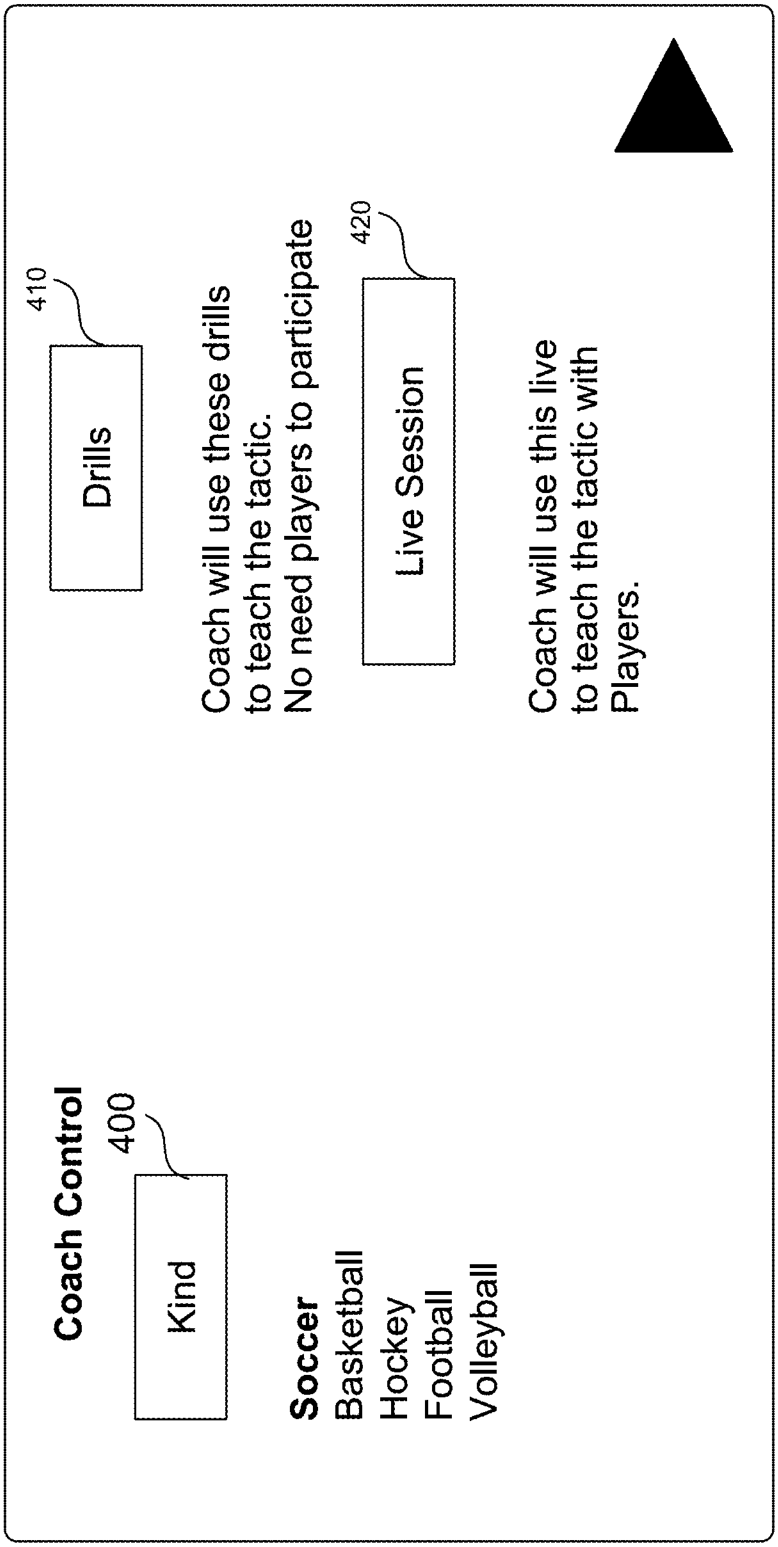
FIGS. 4A-4D show the controls the system can provide to a participant, e.g., a coach.
Figure 4B:
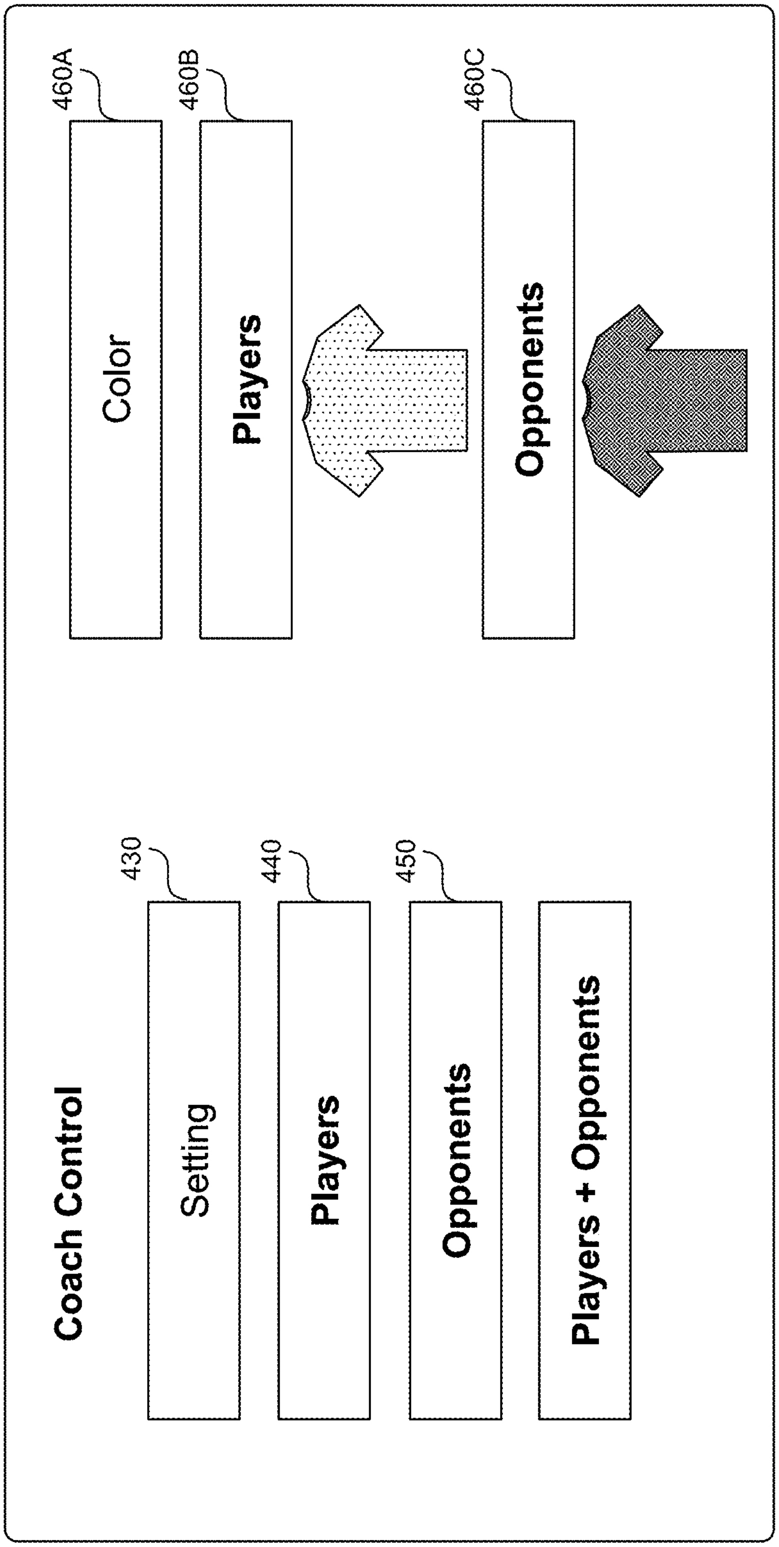
Figure 4C:
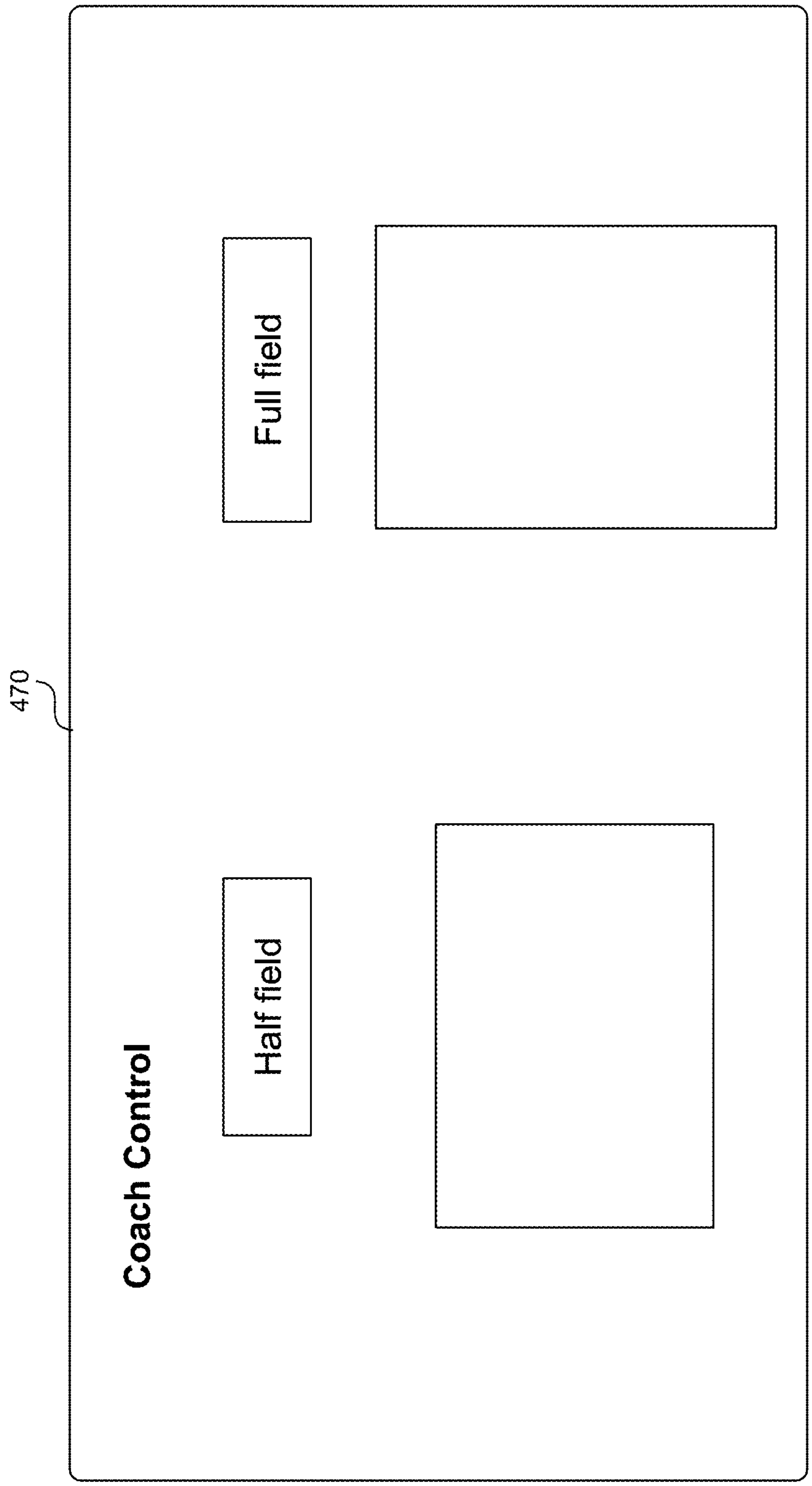
Figure 4D:
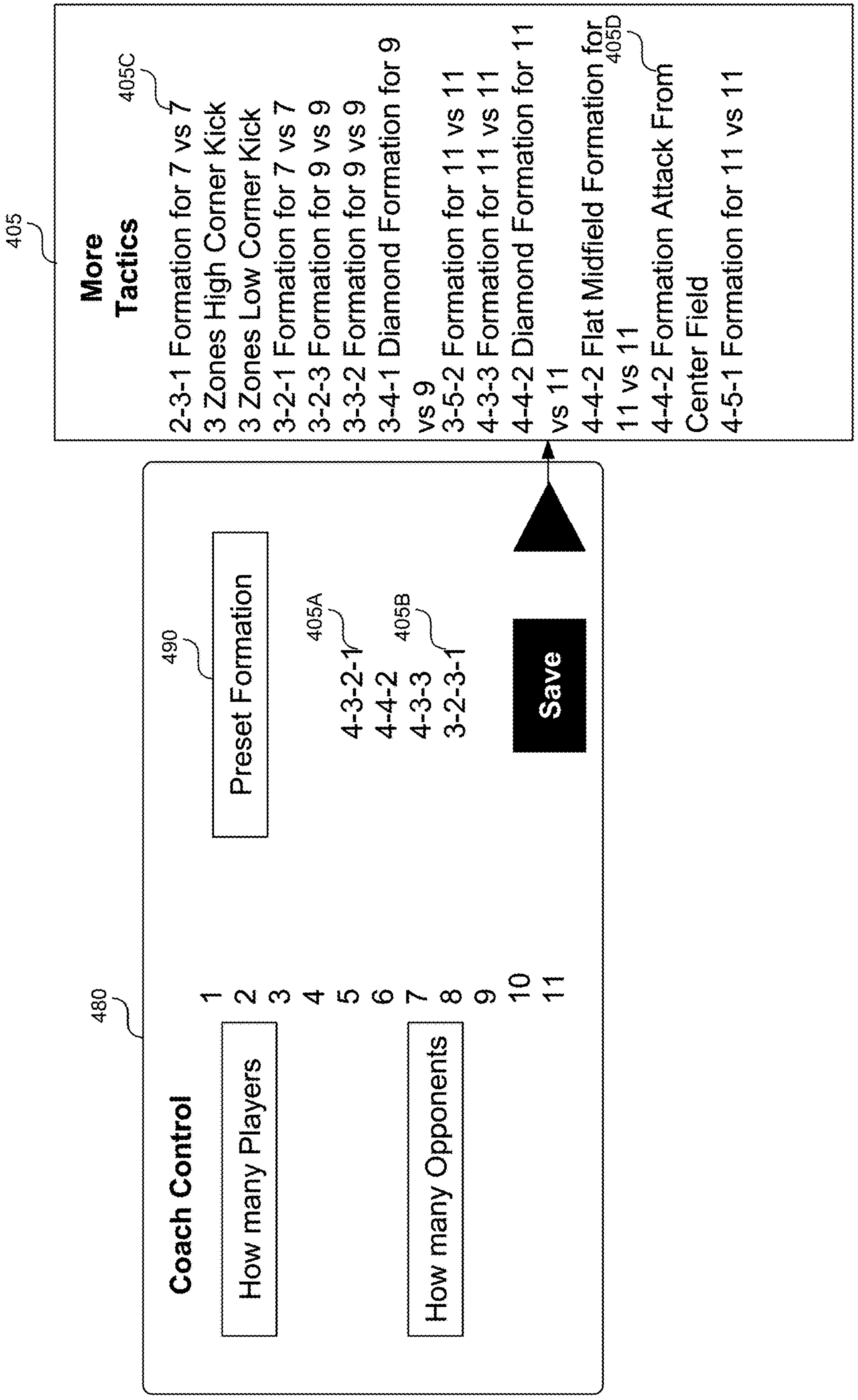

FIG. 3 shows a system to cast the virtual session to a monitor. The monitor 300 can have a High-Definition Multimedia Interface (HDMI) port 320 and can be a TV monitor, computer monitor, wall monitor, etc. The adapter 310 is a streaming media adapter that allows users to play online content such as videos and audio on a monitor with an HDMI port. The adapter 310 is a dongle that plugs into the TV's HDMI port 320. A cable can connect to a USB port to power the adapter 310.

The adapter 310 can be easily portable and can be carried to various locations whether in a hotel room, a communal restaurant, or a meeting room. In addition to connecting the adapter 310 to the HDMI port 320, the adapter 310 can also connect to the Wi-Fi. The adapter 310, upon connecting to the Wi-Fi, can connect to a remote software, such as a cloud software, that can provide the virtual session.

In one embodiment, the server 330 can perform most of the processing and rendering of the virtual session and can send the information regarding the virtual session to the adapter 310 and/or a device 340 associated with the user, such as a mobile device or a tablet. The user can be one of the players and/or the coach. The adapter 310 can forward the information to the monitor 300, which can present audio and visual information to the players. The device 340 associated with the user can communicate with the server 330 through the adapter 310 or directly. The device 340 can provide controls to the users, receive user input, and send the user input to the server 330 either directly or through the adapter 310. The server 330 can process the user input, update to the virtual session, and send the updated information to the adapter 310 for showing on the monitor 300 and/or to the user device 340.

The device 340 associated with the user can receive a rendering of the virtual session from the server 330, including rendering of the controls, or the device 340 can render the controls locally. Alternatively, the device 340 can also perform the rendering and/or processing locally.

FIGS. 4A-4D show the controls the system can provide to a participant, e.g., a coach. The system can enable the participant to select the sport by selecting a user interface element 400. Based on the sport, the system can render an appropriate virtual field 110 in FIG. 1. The system can provide the user interface element 410. Upon receiving the selection of the user interface element 410, the system can enable the coach to retrieve drills from a set of prerecorded drills or to develop a new drill. The system can provide the user interface element 420. Upon receiving the selection of the user interface element 420, the system can create a live session, where multiple players can participate along with the coach and where they can create a game plan or analyze a previously recorded virtual or actual game.

The system can provide a user interface element 430 where the coach can define the game settings. By selecting user interface element 440, the coach can define who the players in the game are. For example, the coach can invite a group of players to the virtual session. By selecting the user interface element 450, the coach can define who the opposing players are. For example, the coach can invite the same or a different group of players to play the opponents in the virtual session. By selecting the user interface element 460A, 460B, 460C the coach can define the visual appearance of the players and opponents, such as the color of their jerseys.

In the user interface 470, the coach can choose whether to view only half the virtual field, or the full virtual field.

In the user interface 480, the coach can determine how many players and how many opponents are participating on each team. The system can provide a user interface element 490. Upon receiving a selection of the user interface element 490, the system can provide a list 405 of available drills and tactics. The list 405 can include various drills and tactics that can be represented numerically 405A, 405B (only two labeled for brevity), with or without a textual explanation 405C, 405D (only two labeled for brevity). In addition, the coach can send email, manage the team schedule, post messages to chat, etc., using the disclosed system.

Figure 5:
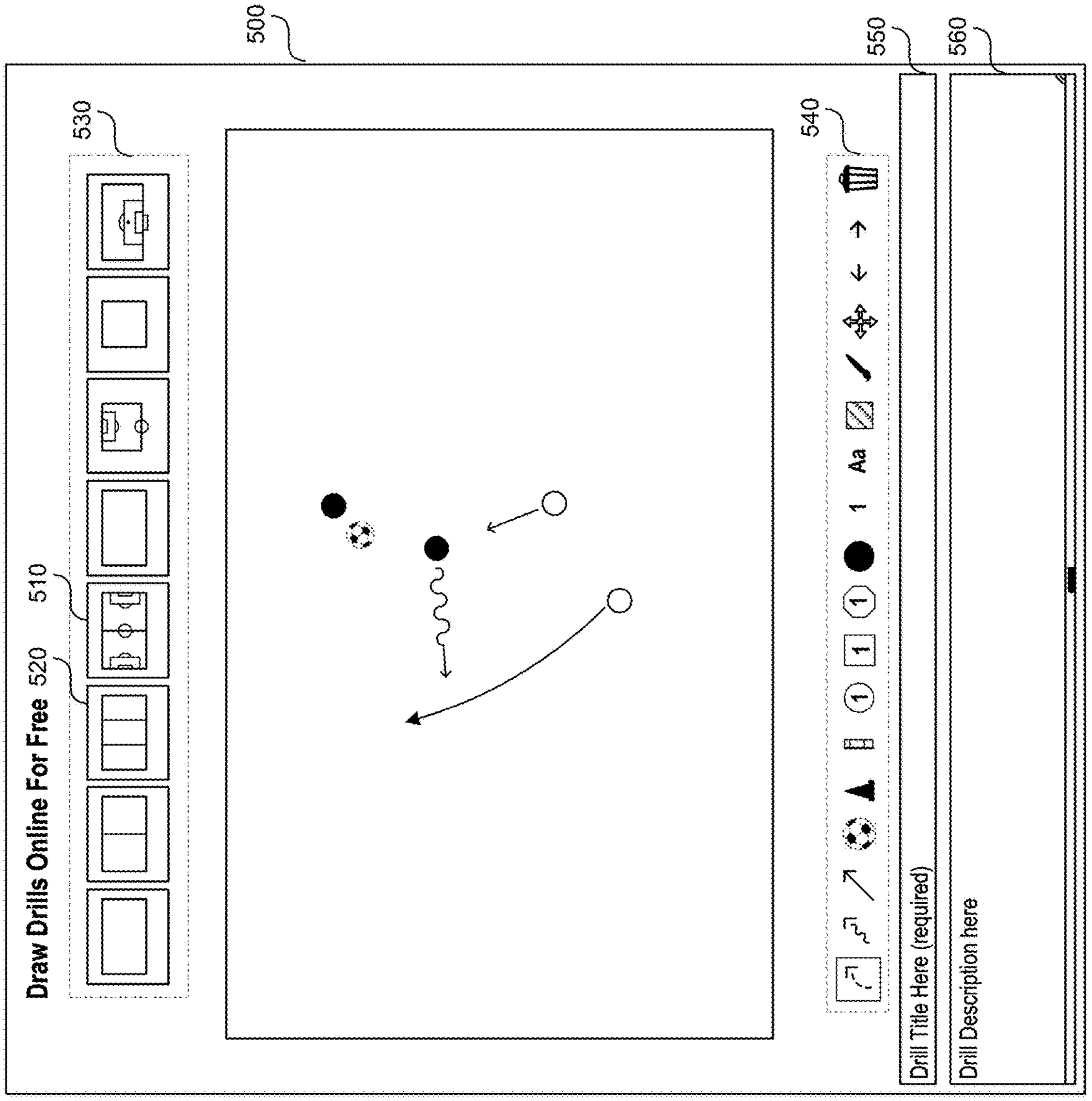
FIG. 5 shows a user interface to create a new drill.

FIG. 5 shows a user interface 500 to create a new drill. The coach can select a virtual field 510, 520 (only two labeled for brevity) from the menu 530. The virtual field can represent different sports such as soccer, volleyball, or football. Also, the virtual field can correspond to a section of the field such as one-half of the field, center of the field, one-quarter of the field, etc.

In addition, the system can provide drawing and text entry tools in the menu 540, such as arrows, balls, and/or various geometric shapes. The system can provide a user interface element 550 that enables the coach to create the title of the drill. Further, the system can provide a user interface element 560 that enables the coach to describe the drill. The system can store the created drill and offer it in the list 405 in FIG. 4D.

Figure 6:
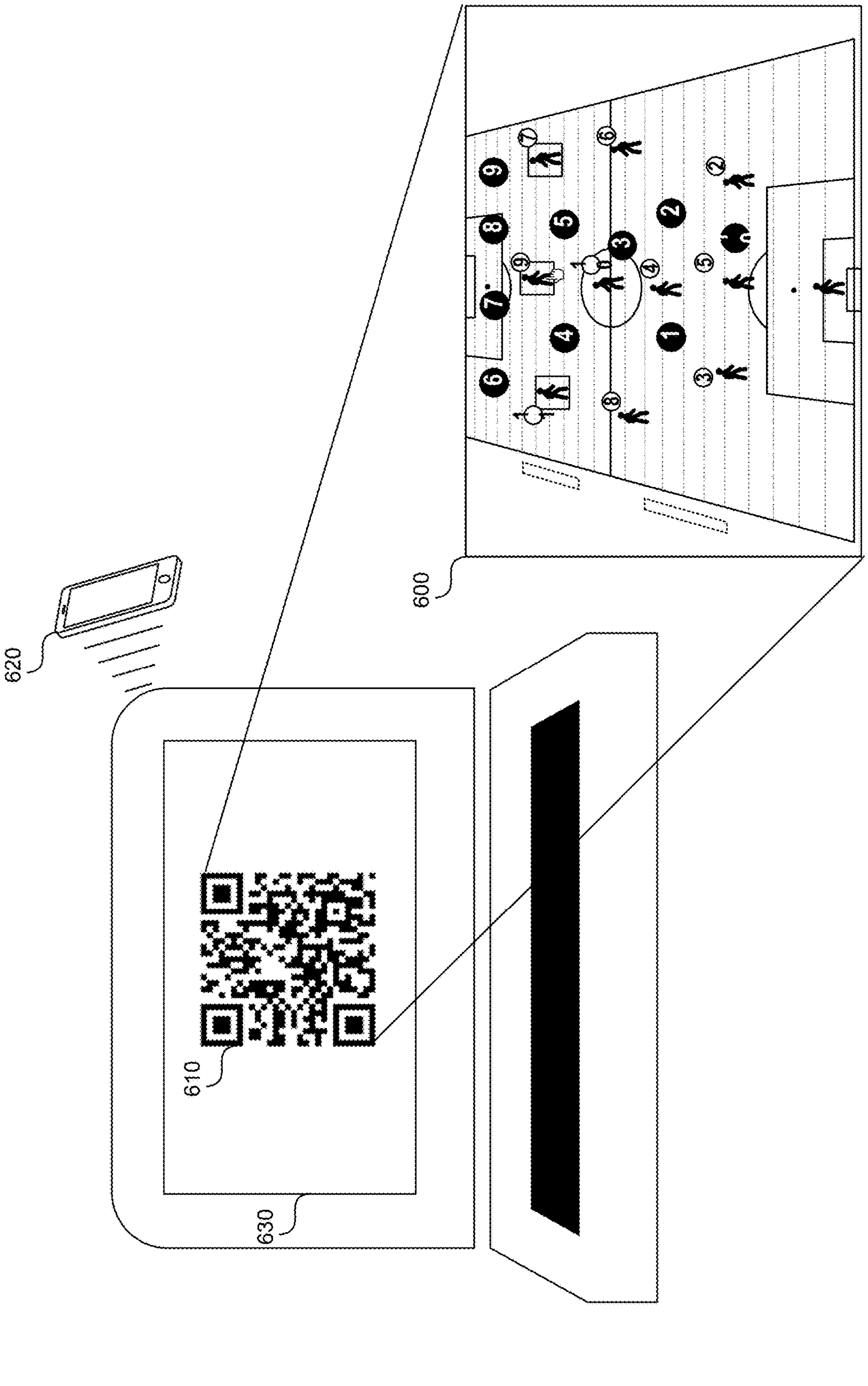
FIG. 6 shows the use of a QR code to enable participants to join a virtual session.

FIG. 6 shows the use of a QR code to enable participants to join a virtual session. Once the system creates a virtual session 600 based on a coach's input, the system can generate a QR code 610 associated with the virtual session. When a user logs into the system, for example through a website, the system can determine whether the user is invited to participate in the virtual session 600. If the user is invited to participate in the virtual session 600, the system can present the QR code 610 on a display 630. The user can scan the QR code 610 with a device 620. Upon scanning the QR code, the device 620 can present the virtual session 600 to the user.

Figure 7:
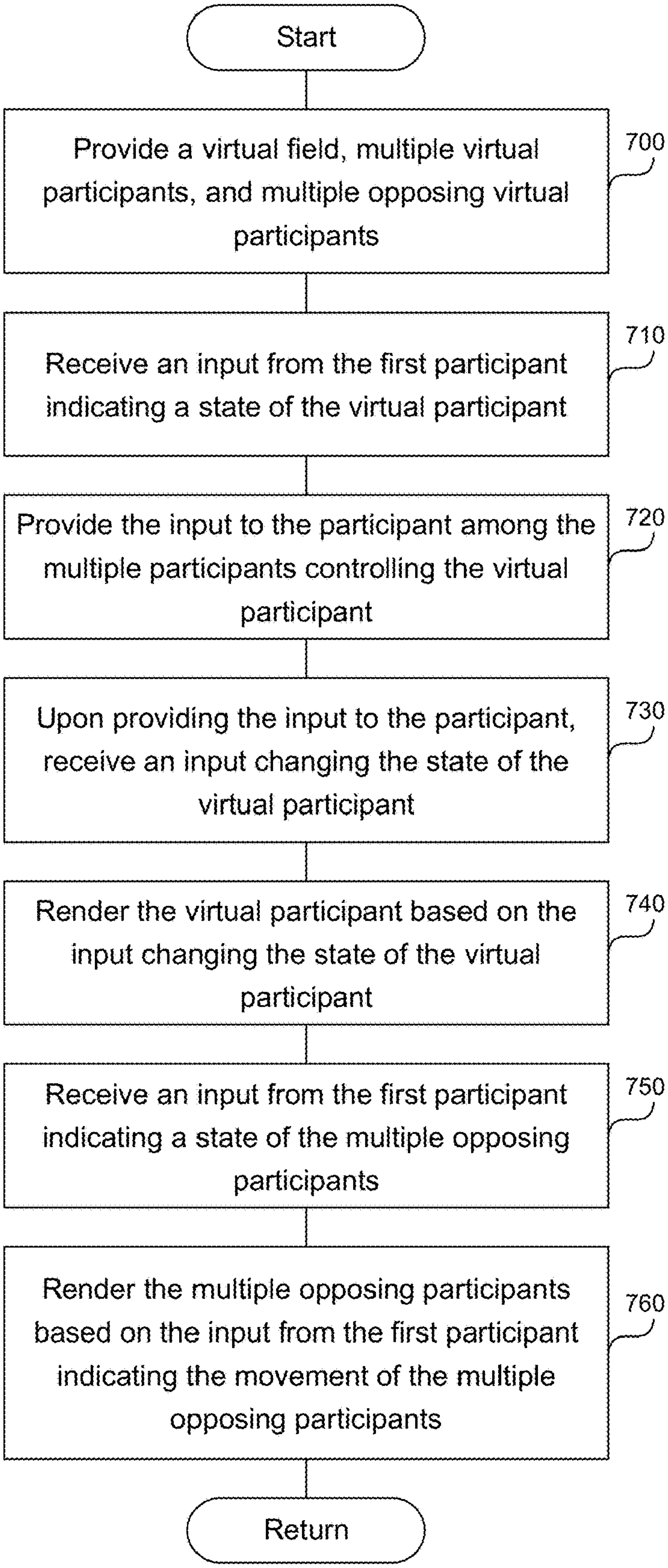
FIG. 7 is a flowchart of a method to enable multiple players and a coach to interact in a virtual game session.

FIG. 7 is a flowchart of a method to enable multiple players and a coach to interact in a virtual game session. A hardware or software processor executing instructions describing this application can, in step 700, provide a virtual field, multiple virtual participants, and multiple opposing virtual participants. A virtual participant among the multiple virtual participants is configured to be controlled by a participant among the multiple participants and a first participant. The multiple opposing virtual participants are configured to be controlled by the first participant. The first participant can be the coach, while multiple participants can be players of the team. In some embodiments, team players can also control one or more of the opposing players.

In step 710, the processor can receive an input from the first participant indicating a state of the virtual participant. The processor can receive the input through a chat channel, an audio channel, through the user interface, etc. For example, the first participant can draw an arrow indicating a motion of the virtual participant. The state of the virtual participant can include an action such as movement of the virtual participant, orientation of the virtual participant, moving the ball in a particular direction such as spiking, setting, kicking, throwing of the ball, etc.

In step 720, the processor can provide the input to the participant among the multiple participants controlling the virtual participant, such as by rendering the drawing provided by the coach, sending the audio to the participant, sending a public message or a private message to the participant by a chat channel, etc.

In step 730, the processor, upon providing the input to the participant, can receive an input changing the state of the virtual participant from the participant. For example, upon receiving an indication from the coach to move the virtual player towards the opposing team's goal, the participant can move the virtual player as directed.

In step 740, the processor can render the virtual participant based on the input changing the state of the virtual participant. For example, the processor can render the virtual player in a new position. The rendering can be photorealistic or can be abstract such as representing the player using a geometric shape.

In step 750, the processor can receive an input from the first participant indicating a state of the multiple opposing virtual participants. In other words, the first participant, e.g., the coach, can control actions of the opposing players, such as their orientation, movement, and/or handling of the ball.

In step 760, upon receiving the input from the first participant indicating the state of the multiple opposing virtual participants, the processor can render the multiple opposing virtual participants based on the input from the first participant indicating the movement of the multiple opposing virtual participants. For example, the coach can indicate the motion of the opposing players, and the processor can render the opposing players moving according to the coach's instructions.

The processor can generate and provide a QR code specific to one virtual session, were scanning the QR code enables participation in the virtual session. The processor can receive an indication to create a virtual session such as an indication from the coach. The virtual session can be a game planning session, a virtual game, a review of a recording of a virtual or an actual game, etc. The processor can provide a QR code associated with the virtual session on a display. A device associated with a participant can scan the QR code. Upon scanning the QR code, the device associated with the participant can provide an interface to the virtual session. For example, upon scanning the QR code, the device can activate an application running on the device and associated with the disclosed system that presents the specific virtual session associated with the QR code. The interface can include a control configured to change a state associated with the virtual participant on the virtual field. Changing the state of the virtual player can include moving the virtual player via a normal or fast run, changing the virtual player's orientation, specifying an action to perform with the ball such as serving, receiving, setting, spiking, throwing, or kicking. For example, the action can include shooting the ball via a short pass, long pass, etc.

The processor can enable grouping of participants so that the first participant, e.g., the coach, can control the whole group. The participants can be the players or the opposing team players. The processor can receive an indication to create a group of opposing virtual participants from the multiple opposing virtual participants. Based on the indication, the processor can create the group of opposing virtual participants, where the group of opposing virtual participants is configured to be controlled by the first participant. The group can include one or more of the multiple opposing virtual participants. The processor can receive an input from the first participant indicating a state, e.g., motion, of the group of opposing virtual participants. The processor can render the group of opposing virtual participants based on the indicated state.

The processor can simulate a state of opposing participants to relieve the first participant from having to control multiple opposing players. The processor can receive an indication to simulate a motion of at least a portion of the multiple opposing virtual participants. For example, the code can indicate which opposing players the processor should simulate. The processor can obtain a state associated with the participant among the multiple participants. Based on the state associated with the participant among the multiple participants, the processor can simulate the motion of at least the portion of the multiple opposing virtual participants. The processor can render at least the portion of the multiple opposing virtual participants based on the simulation.

The system can include an intermediary device such as an HDMI adapter configured to interface between a server and a monitor to enable the monitor to display the virtual session, without the monitor running an application associated with the system. The processor can receive an indication from an intermediary device to initiate the virtual session. The processor can provide an indication of the virtual field, the multiple virtual participants, and the multiple opposing virtual participants to the intermediary device. The intermediary device can cause a rendering of the virtual field, the multiple virtual participants, and the multiple opposing virtual participants on a display, such as a TV monitor.

The processor can record the virtual session including multiple actions associated with the multiple participants and multiple actions associated with the multiple opposing virtual participants to obtain a recording. The processor can create a link to the recording and can share the link among the players for later review. In addition, the processor can provide links to recorded games, such as games played by the team or a different team, including a professional team.

The processor can obtain a recording of a game, such as a virtual game or an actual game played by the team or a different team such as a professional team. The processor can enable the first participant to provide commentary associated with the game by providing a drawing tool and an audio channel. The processor can receive a drawing from the first participant and an audio. The processor can provide the audio to the participants via the audio channel. The processor can render the drawing from the first participant over the recording of the game.

Figure 8:
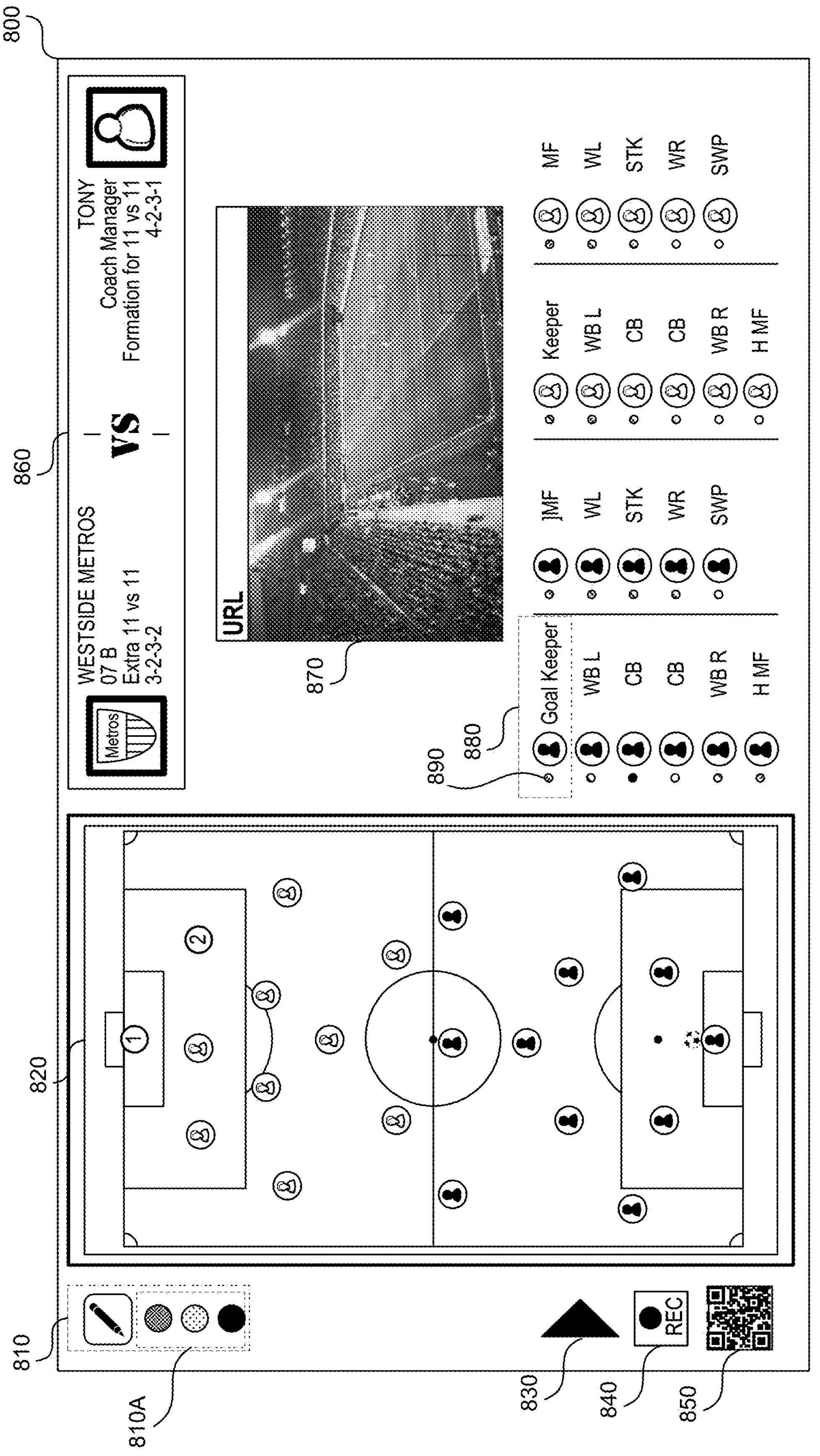
FIG. 8 shows a virtual session, according to another embodiment.

FIG. 8 shows a virtual session 800, according to another embodiment. The virtual session 800 can be shown on a user device or presented through a website. The virtual session 800 can include the drawing tools 810, virtual sports field 820, playback button 830, recording button 840, a QR code 850, team's information and coach's information 860, video of a previously recorded game 870, player detail 880, and player status 890.

The drawing tools 810 can enable the coach or the players to draw geometric shapes such as arrows, circles, squiggly lines, rectangles, etc. to indicate an action. The drawings can also be color-coded using colors 810A.

Using the virtual session 800, the coach and the players can express their thoughts and plans of action in the virtual session 800, such as moving the players, and/or passing the ball. When the coach can see the overall picture and plans of the players, the coach can improve and modify the tactics of the whole team.

The recording button 840 enables the coach or players to record the virtual session 800. The playback button 830 enables the coach or players to replay the recording virtual session 800, or to replay video of a previously recorded game 870. At the end of virtual session 800, the system can generate a link to the recording, and the coach can provide a link to a player.

The QR code 850 enables a player to join the game as described in this application. Player detail 880 can include the name and position of the player. Player status 890 can indicate whether the player has joined the game. For example, the player status 890 can indicate using color coding whether the player has joined the game, e.g. by using green for a player that has joined, and red for a player that is absent.

Figure 9A:
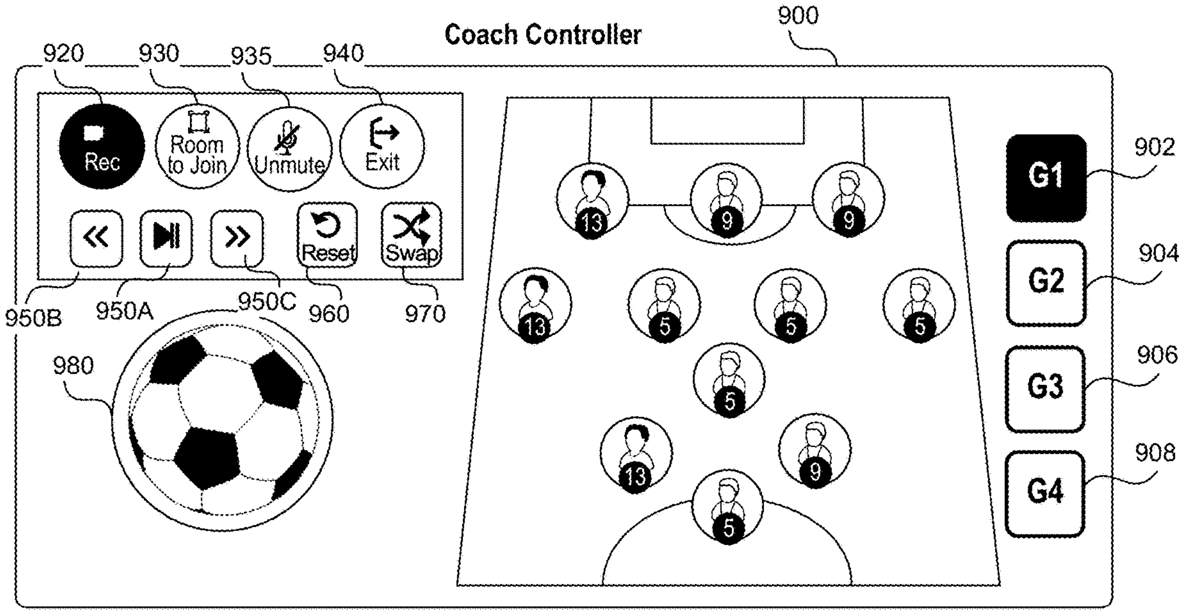
FIGS. 9A-9B show coach and player consoles or controllers, respectively.
Figure 9B:
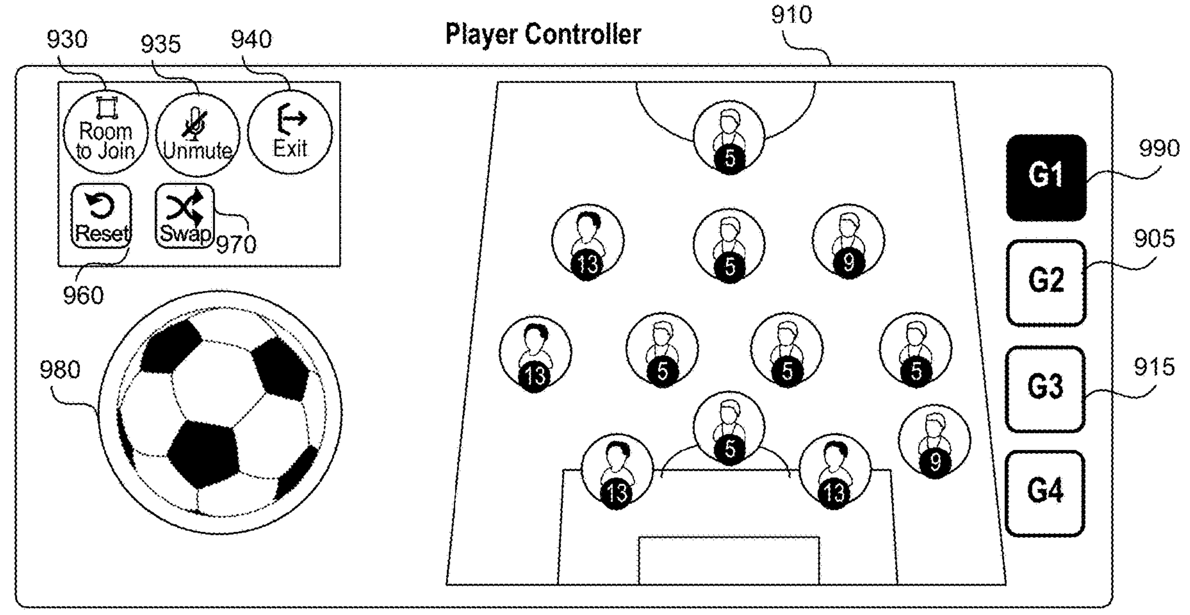

FIGS. 9A-9B show coach and player consoles or controllers, respectively. The coach console 900 and the player console 910 can share some controls. The coach console 900 can enable the coach to control the opposing virtual team by grouping the players into four individual groups G1-G4, or to control the individual virtual players while the player console 910 enables the player to control a single virtual player.

Selecting button 920 enables recording of the virtual session. Selecting button 930 enables the console 900, 910 to scan a QR code and thus join the virtual session. Button 935 is the microphone, and toggling the button enables muting an unmuting of the microphone. Selecting button 940 enables the coach and the player to exit the virtual session. Buttons 950A, 950B, 950C enable playing, rewinding, and fast forwarding, respectively, a recording.

Selecting button 960 resets the virtual player positions to the starting formation. Selecting button 970 enables moving the ball from the virtual player currently in control of the ball to another virtual player. Button 980 can control the motion of a virtual player.

The coach console 900 can enable the coach to group the virtual players 5, 9, 13 into multiple groups, such as four groups as shown in FIG. 9A. To group the players, the coach can hold button 902 for a brief period, such as one second, then select the virtual players 5 that the coach wants to group together. After selecting the button 902, the grouping of the players is complete. Each button 902, 904, 906, 908 on the coach console 900 can represent a group of players. To control a particular group, the coach can select the button 902, 904, 906, 908 representing the group. The coach can direct the movements of the selected group using the button 980. The coach can assign the substitute players who join the virtual session to control a virtual player in the opposing virtual team. The substitute players can control the movement of the virtual player in the opposing team, but cannot control the placement of the ball.

Selecting the button 990 on the player console 900 enables the player to indicate which virtual player to pass the ball to. For example, the player can toggle the button 990, then select the virtual player to whom to pass the ball, and then select the button 905 to indicate to release the ball to the virtual player. Alternatively, the player can select the virtual player to whom to pass the ball, and then select the button 990 to indicate to pass the ball. Selecting the button 915 indicates to shoot the ball at the goal.

Figure 10:
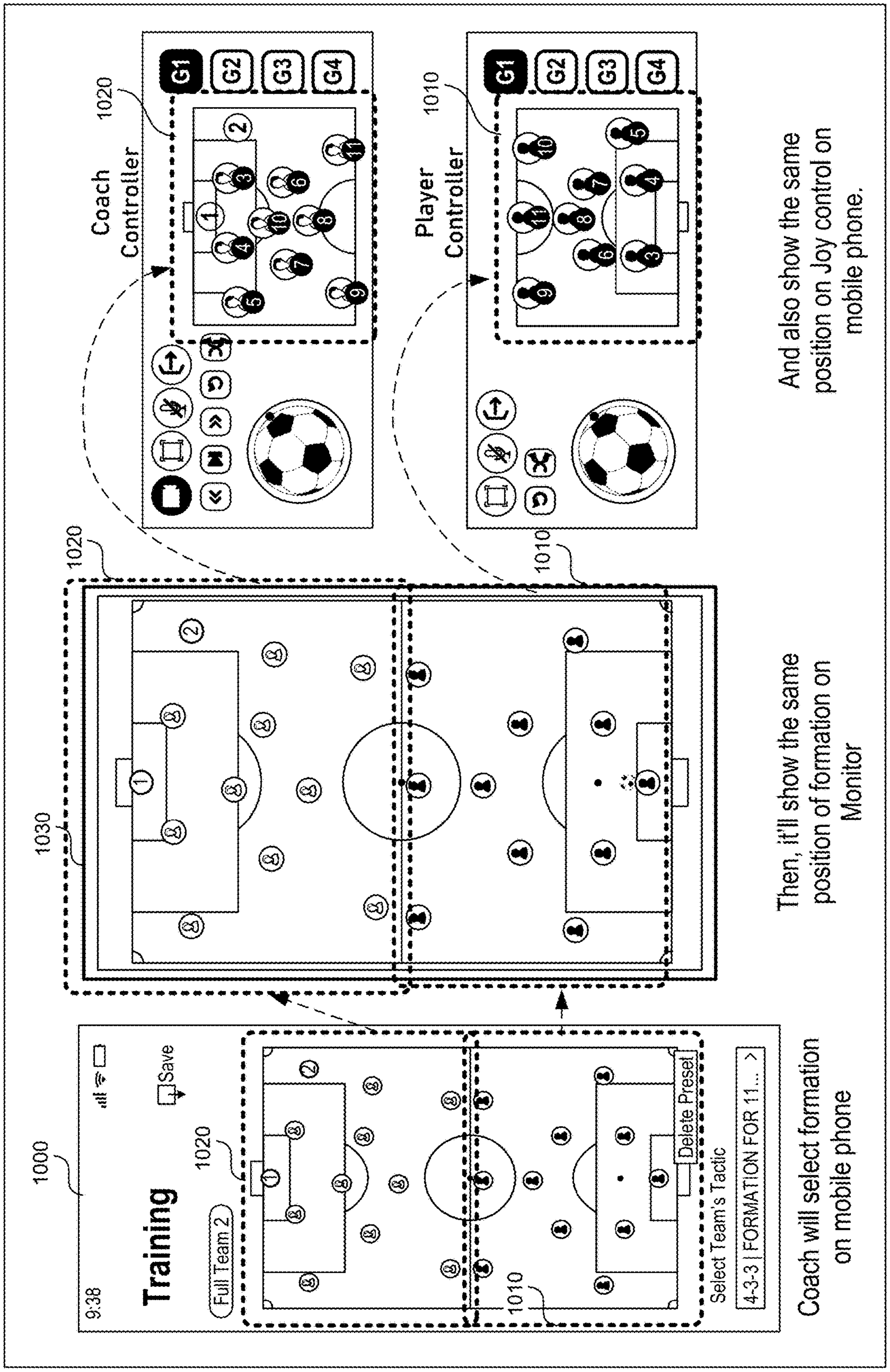
FIG. 10 shows user interfaces shown on displays of various devices that can be part of the system.

FIG. 10 shows user interfaces shown on displays of various devices that can be part of the system. The user interface 1000 can be shown on coach's mobile phone. The user interface 1000 can enable the coach to select multiple virtual players and determine their formation 1010, such as 4-3-3. In addition, the coach can select multiple opposing virtual players and determine their formation 1020.

Once the coach selects the formations, the server can update the website to show the selected formations 1010, 1020 in the user interface 1030. The user interface 1030 can be presented on a mobile device of a user, on a monitor visible to all players, or on a monitor available to one or more players. The server can also present a portion of the information on the coach console 900 and player console 910. The coach console 900 can show the opposing virtual players that the coach can control and their formation 1020, while the player console 910 can show the multiple virtual players formation 1010.

Computer System

Figure 11:
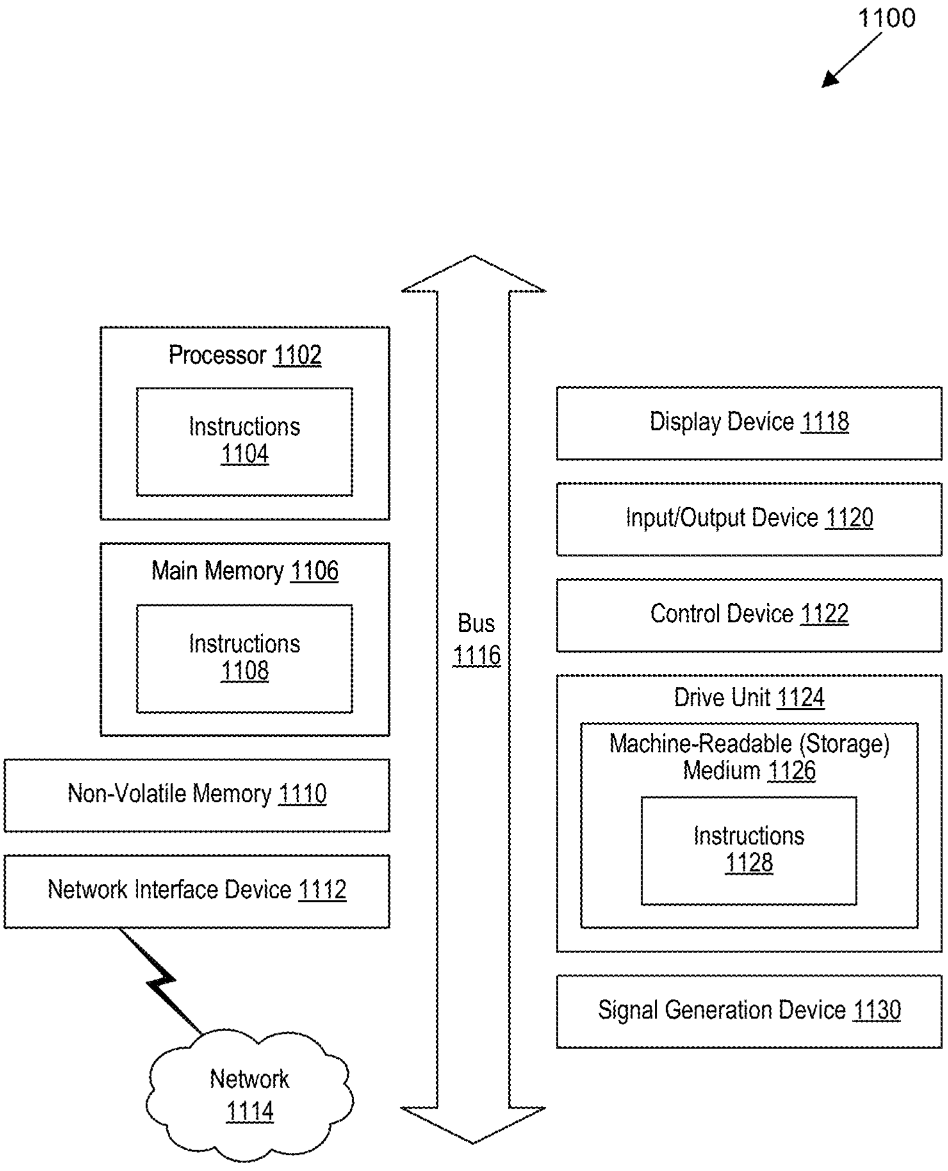
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementation, the computer system 1100 can be an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

Remarks

The terms "example", "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one non-transitory, computer-readable storage medium storing instructions to enable multiple players and a coach to interact in a virtual game session, which, when executed by at least one data processor of a system, cause the system to:

render a virtual sports field, multiple virtual players associated with the multiple players, and multiple opposing virtual players,
  wherein a virtual player among the multiple virtual players is configured to be controlled by a player among the multiple players and the coach,
  wherein the multiple opposing virtual players are configured to be controlled by the coach;

determine a starting position of the multiple virtual players and the multiple opposing virtual players based on a player positioning in a previously recorded game session;

cause simultaneous display of the rendered virtual sports field, multiple virtual players associated with the multiple players, and multiple opposing virtual players next to the previously recorded game session on a first display screen of a player device and a second display screen of a coach device;

receive an input from the coach on a first controller of the coach device indicating a movement of the virtual player;

provide the input to the player among the multiple players controlling the virtual player through a second controller of the player device;

upon providing the input to the player, receive an input on the second controller of the player device from the player moving the virtual player;

re-render the virtual player based on the input moving the virtual player;

receive an input from the coach on the first controller of the coach device indicating a movement of the multiple opposing virtual players; and upon receiving the input from the coach indicating the movement of the multiple opposing virtual players, re-render the multiple opposing virtual players based on the input from the coach indicating the movement of the multiple opposing virtual players.

2. The at least one non-transitory, computer-readable storage medium of claim 1, comprising instructions to:

receive an indication to create the virtual game session;

provide a quick response (QR) code associated with the virtual game session;

cause a device associated with a player to scan the QR code; and upon scanning the QR code, cause the device associated with the player to provide an interface to the virtual game session,
  wherein the interface includes a control configured to change a state associated with the virtual player on the virtual sports field.

3. The at least one non-transitory, computer-readable storage medium of claim 1, comprising instructions to:

receive an indication to create a group of opposing players from the multiple opposing virtual players;

based on the indication, create the group of opposing players,
  wherein the group of opposing players is configured to be controlled by the coach;

receive an input from the coach indicating a state of the group of opposing players; and render the group of opposing players based on the indicated state.

4. The at least one non-transitory, computer-readable storage medium of claim 1, comprising instructions to:

receive an indication to simulate a state of at least a portion of the multiple opposing virtual players;

obtain a state associated with the virtual player among the multiple virtual players;

based on the state associated with the virtual player among the multiple virtual players, simulate the state of at least the portion of the multiple opposing virtual players; and render at least the portion of the multiple opposing virtual players based on the simulation.

5. The at least one non-transitory, computer-readable storage medium of claim 1, comprising instructions to:
receive an indication from an intermediary device to initiate the virtual game session;
provide an indication of the virtual sports field, the multiple virtual players associated with the multiple players, and the multiple opposing virtual players; and
cause a rendering of the virtual sports field, the multiple virtual players associated with the multiple players, and the multiple opposing virtual players on a display.

6. The at least one non-transitory, computer-readable storage medium of claim 1, comprising instructions to:
record the virtual game session including multiple actions associated with the multiple virtual players and multiple actions associated with the multiple opposing virtual players to obtain a recording;
create a link to the recording; and
share the link.

7. The at least one non-transitory, computer-readable storage medium of claim 1, comprising instructions to:
obtain a recording of a game;
enable the coach to provide commentary associated with the game by providing a drawing tool and an audio channel;
receive a drawing from the coach and an audio;
provide the audio to the player among the multiple players via the audio channel; and
render the drawing from the coach over the recording of the game.

8. A method comprising:
rendering a virtual field, multiple virtual participants, and multiple opposing virtual participants,
wherein a virtual participant among the multiple virtual participants is configured to be controlled by a participant among multiple participants and a first participant,
wherein the multiple opposing virtual participants are configured to be controlled by the first participant;
determining a starting position of the multiple virtual participants and the multiple opposing virtual participants based on a participant positioning in a previously recorded game session;
causing simultaneous display of the rendered virtual field, multiple virtual participants associated with the multiple participants, and multiple opposing virtual participants next to the previously recorded game session on a first display screen of a participant device and a second display screen of a first participant device;
receiving an input from the first participant on a first controller of the first participant device indicating a movement of the virtual participant;
providing the input to the participant among the multiple participants controlling the virtual participant through the participant device;
upon providing the input to the participant, receiving an input on a second controller of the participant device changing a state of the virtual participant;
re-rendering the virtual participant based on the input changing the state of the virtual participant;
receiving an input from the first participant on the first controller of the first participant device indicating a state of the multiple opposing virtual participants; and
upon receiving the input from the first participant indicating the state of the multiple opposing virtual participants, re-rendering the multiple opposing virtual participants based on the input from the first participant indicating the state of the multiple opposing virtual participants.

9. The method of claim 8, comprising:
receiving an indication to create a virtual session;
providing a quick resposse (QR) code associated with the virtual session;
causing a device associated with a participant to scan the QR code; and
upon scanning the QR code, causing the device associated with the participant to provide an interface to the virtual session,
wherein the interface includes a control configured to change a state associated with the virtual participant on the virtual field.

10. The method of claim 8, comprising:
receiving an indication to create a group of opposing virtual participants from the multiple opposing virtual participants;
based on the indication, creating the group of opposing virtual participants,
wherein the group of opposing virtual participants is configured to be controlled by the first participant;
receiving an input from the first participant indicating a state of the group of opposing virtual participants; and
rendering the group of opposing virtual participants based on the indicated state.

11. The method of claim 8, comprising:
receiving an indication to simulate a state of at least a portion of the multiple opposing virtual participants;
obtaining a state associated with the virtual participant among the multiple virtual participants;
based on the state associated with the virtual participant among the multiple virtual participants, simulating the state of at least the portion of the multiple opposing virtual participants; and
rendering at least the portion of the multiple opposing virtual participants based on the simulation.

12. The method of claim 8, comprising:
receiving an indication from an intermediary device to initiate a virtual session;
providing an indication of the virtual field, the multiple virtual participants, and the multiple opposing virtual participants; and
causing a rendering of the virtual field, the multiple virtual participants, and the multiple opposing virtual participants on a display.

13. The method of claim 8, comprising:
obtaining a recording of a game;
enabling the first participant to provide commentary associated with the game by providing a drawing tool and an audio channel;
receiving a drawing from the first participant and an audio;
providing the audio to the multiple participants via the audio channel; and
rendering the drawing from the first participant over the recording of the game.

14. A system comprising:
at least one hardware processor; and
at least one non-transitory memory storing instructions, which, when executed by the at least one hardware processor, cause the system to:
render a virtual field, multiple virtual participants, and multiple opposing virtual participants, wherein a virtual participant among the multiple virtual participants is configured to be controlled by a participant among multiple participants and a first participant, wherein the multiple opposing virtual participants are configured to be controlled by the first participant;

determine a starting position of the multiple virtual participants and the multiple opposing virtual participants based on a participant positioning in a previously recorded game session;

cause simultaneous display of the rendered virtual field, multiple virtual participants associated with the multiple participants, and multiple opposing virtual participants next to the previously recorded game session on a first display screen of a participant device and a second display screen of a first participant device;

receive an input from the first participant on a first controller of the first participant device indicating a movement of the virtual participant;

provide the input to the participant among the multiple participants controlling the virtual participant through the participant device;

upon providing the input to the participant, receive an input on a second controller of the participant device changing a state of the virtual participant;

re-render the virtual participant based on the input changing the state of the virtual participant;

receive an input from the first participant on the first controller of the first participant device indicating a state of the multiple opposing virtual participants; and upon receiving the input from the first participant indicating the state of the multiple opposing virtual participants, re-render the multiple opposing virtual participants based on the input from the first participant indicating the state of the multiple opposing virtual participants.

15. The system of claim 14, comprising instructions to:

receive an indication to create a virtual session;

provide a quick response (QR) code associated with the virtual session;

cause a device associated with a participant to scan the QR code; and upon scanning the QR code, cause the device associated with the participant to provide an interface to the virtual session, wherein the interface includes a control configured to change a state associated with the virtual participant on the virtual field.

16. The system of claim 14, comprising instructions to:

receive an indication to create a group of opposing virtual participants from the multiple opposing virtual participants;

based on the indication, create the group of opposing virtual participants, wherein the group of opposing virtual participants is configured to be controlled by the first participant;

receive an input from the first participant indicating a state of the group of opposing virtual participants; and render the group of opposing virtual participants based on the indicated state.

17. The system of claim 14, comprising instructions to:

receive an indication to simulate a state of at least a portion of the multiple opposing virtual participants;

obtain a state associated with the virtual participant among the multiple virtual participants;

based on the state associated with the virtual participant among the multiple virtual participants, simulate the state of at least the portion of the multiple opposing virtual participants; and render at least the portion of the multiple opposing virtual participants based on the simulation.

18. The system of claim 14, comprising instructions to:

receive an indication from an intermediary device to initiate a virtual session;

provide an indication of the virtual field, the multiple virtual participants, and the multiple opposing virtual participants; and cause a rendering of the virtual field, the multiple virtual participants, and the multiple opposing virtual participants on a display.

19. The system of claim 14, comprising instructions to:

record a virtual session including multiple actions associated with the multiple virtual participants and multiple actions associated with the multiple opposing virtual participants to obtain a recording;

create a link to the recording; and share the link.

20. The system of claim 14, comprising instructions to:

obtain a recording of a game;

enable the first participant to provide commentary associated with the game by providing a drawing tool and an audio channel;

receive a drawing from the first participant and an audio;

provide the audio to the participant among the multiple participants via the audio channel; and render the drawing from the first participant over the recording of the game.

* * * * *